US008782090B2

(12) United States Patent
Barnea et al.

(10) Patent No.: US 8,782,090 B2
(45) Date of Patent: Jul. 15, 2014

(54) AIDING REPORT CONSTRUCTION BASED ON INFERENCE OF IMPLICIT APPLICATION LEVEL RELATIONSHIPS

(75) Inventors: Maya Barnea, Haifa (IL); Nili Guy, Kiriat Ata (IL); Samuel Kallner, Menashe (IL); Yoav Rubin, Haifa (IL); Gal Shachor, Yokneam (IL)

(73) Assignee: International Business Machines Corporation, Armonk, NY (US)

( * ) Notice: Subject to any disclaimer, the term of this patent is extended or adjusted under 35 U.S.C. 154(b) by 260 days.

(21) Appl. No.: 12/941,058

(22) Filed: Nov. 7, 2010

(65) Prior Publication Data

US 2012/0117117 A1    May 10, 2012

(51) Int. Cl.
  *G06F 17/30*    (2006.01)
(52) U.S. Cl.
  USPC ............................ 707/792; 717/127; 717/151
(58) Field of Classification Search
  USPC ................................... 707/792; 717/127, 151
  See application file for complete search history.

(56) References Cited

U.S. PATENT DOCUMENTS

| 7,505,991 | B2 |  | 3/2009 | Fifield et al. |  |
| 7,784,033 | B2 | * | 8/2010 | Srivastava | 717/127 |
| 2004/0003132 | A1 | * | 1/2004 | Stanley et al. | 709/316 |
| 2004/0205617 | A1 | * | 10/2004 | Light | 715/523 |
| 2004/0252134 | A1 | * | 12/2004 | Bhatt et al. | 345/619 |
| 2004/0255239 | A1 | * | 12/2004 | Bhatt et al. | 715/505 |
| 2006/0206866 | A1 | * | 9/2006 | Eldrige et al. | 717/122 |
| 2007/0179975 | A1 |  | 8/2007 | Teh et al. |  |
| 2007/0179987 | A1 | * | 8/2007 | Lim | 707/200 |
| 2007/0234327 | A1 | * | 10/2007 | Baxter et al. | 717/151 |
| 2008/0091709 | A1 |  | 4/2008 | Chang et al. |  |
| 2009/0100360 | A1 |  | 4/2009 | Janzen et al. |  |
| 2009/0198729 | A1 | * | 8/2009 | Gong | 707/103 R |
| 2010/0094911 | A1 | * | 4/2010 | Bird | 707/802 |
| 2011/0044435 | A1 | * | 2/2011 | Bachran et al. | 379/88.17 |
| 2011/0055816 | A1 | * | 3/2011 | Joukov et al. | 717/126 |

FOREIGN PATENT DOCUMENTS

WO    2008042562    4/2008

OTHER PUBLICATIONS

Tomas Kliegr et al., "Semantic Analytical Reports: A Framework for Post-Processing Data Mining Results", URL: http://nb.vse.cz/~svatek/ismis09draft.pdf, 2009.
Celina M. Olszak and Ewa Ziemba, "Business Intelligence Systems in the Holistic Infrastructure Development Supporting Decision-Making in Organisations", URL:http://ijikm.org/Volume1/IJIKMv1p047-058Olszak19.pdf, Dec. 1, 2006.

* cited by examiner

*Primary Examiner* — Dennis Truong

(57) ABSTRACT

A method of aiding report construction based on inference of implicit application level relationships is provided herein. The method may include the following steps: analyzing a model of a software application to yield data elements associated with base objects of the software application and relationships between the data elements; generating a list of reportable objects comprising the base objects and objects associated with the data elements and their relationships; ordering the reportable objects based on at least one of: content and usage of the reportable objects, to yield an ordered list; and presenting the ordered list in a form usable for building a report on the software application, wherein at least one of: the analyzing, the generating, the ordering, and the presenting, is carried out by at least one processor.

21 Claims, 3 Drawing Sheets

*300*

```
┌─────────────────────────────────────────────────────┐
│ ANALYZING A MODEL OF A SOFTWARE APPLICATION TO      │
│ YIELD DATA ELEMENTS ASSOCIATED WITH BASE OBJECTS    │──310
│ OF THE SOFTWARE APPLICATION AND RELATIONSHIPS       │
│ BETWEEN THE DATA ELEMENTS                           │
└─────────────────────────────────────────────────────┘
                          │
┌─────────────────────────────────────────────────────┐
│ GENERATING A LIST OF REPORTABLE OBJECTS COMPRISING  │
│ THE BASE OBJECTS AND OBJECTS ASSOCIATED WITH THE    │──320
│ DATA ELEMENTS AND THEIR RELATIONSHIPS               │
└─────────────────────────────────────────────────────┘
                          │
┌─────────────────────────────────────────────────────┐
│ ORDERING THE REPORTABLE OBJECTS BASED ON AT         │
│ LEAST ONE OF: CONTENT AND USAGE OF THE              │──330
│ REPORTABLE OBJECTS, TO YIELD AN ORDERED LIST        │
└─────────────────────────────────────────────────────┘
                          │
┌─────────────────────────────────────────────────────┐
│ PRESENTING THE ORDERED LIST IN A FORM USABLE FOR    │──340
│ BUILDING A REPORT ON THE SOFTWARE APPLICATION       │
└─────────────────────────────────────────────────────┘
                          │
┌─────────────────────────────────────────────────────┐
│ (OPTIONAL) ORDERING OF ATTRIBUTES ASSOCIATED WITH   │
│ THE REPORTABLE OBJECTS, WHEREIN THE ORDERING OF     │
│ THE ATTRIBUTES IS BASED ON AT LEAST ONE OF:         │──350
│ AVAILABILITY OF THE DATA AND USAGE OF THE DATA.     │
└─────────────────────────────────────────────────────┘
                          │
┌─────────────────────────────────────────────────────┐
│ (OPTIONAL) INPUTTING THE ORDERED REPORTABLE OBJECTS │
│ IN VIEW OF THEIR RESPECTIVE ORDERED ATTRIBUTES,     │──360
│ INTO A REPORTING TOOL TO YIELD A REPORT ON THE      │
│ SOFTWARE APPLICATION.                               │
└─────────────────────────────────────────────────────┘
```

Figure 3

AIDING REPORT CONSTRUCTION BASED ON INFERENCE OF IMPLICIT APPLICATION LEVEL RELATIONSHIPS

BACKGROUND

1. Technical Field

The present invention relates to software reporting systems and more particularly, to an aiding tool for such systems.

2. Discussion of the Related Art

Users of large information technology (IT) systems usually do not understand the underlying data model of the software applications they are using. This situation is typical since the users, being business people, are not responsible for developing the software applications and so a deep understanding of the data model is not necessary. However, over the life cycle of IT business analysis, reporting, for example, of the compliance of business rules and requirements of these software applications, plays an important role. This reporting is usually carried out by business people mainly because the developers of the software application do not always anticipate all of the reporting needs of the users (business people) of their applications.

Many reporting tools are known in the art and are implemented along the life cycle of IT systems and business analytics. Currently reports are typically generated either based on an existing database schema or based on a finite predefined set of developer provided objects that serve as a rigid set of reportable objects which is the basis for the reports. Current solutions offer little or no flexibility as to the scope of the reportable objects and more specifically, to the relationships between data elements of the software application as manifested in the reportable objects.

BRIEF SUMMARY

One aspect of the invention provides a method of aiding report construction based on inference of implicit application level relationships. The method may start with the stage of analyzing a model of a software application to yield data elements associated with base objects of the software application and relationships between the data elements. The method then goes on to the stage of generating a list of reportable objects comprising the base objects and objects associated with the data elements and their relationships. The method proceeds to ordering the reportable objects based on at least one of: content and usage of the reportable objects, to yield an ordered list. Then the method goes one to the stage of presenting the ordered list in a form usable for building a report on the software application.

Other aspects of the invention may include a system arranged to execute the aforementioned method and a computer readable program configured to execute the aforementioned method. These, additional, and/or other aspects and/or advantages of the embodiments of the present invention are set forth in the detailed description which follows; possibly inferable from the detailed description; and/or learnable by practice of the embodiments of the present invention.

BRIEF DESCRIPTION OF THE DRAWINGS

For a better understanding of embodiments of the invention and to show how the same may be carried into effect, reference will now be made, purely by way of example, to the accompanying drawings in which like numerals designate corresponding elements or sections throughout.

In the accompanying drawings:

FIG. 3 is a high level flowchart diagram illustrating a method according to some embodiments of the invention.

Figure 1:
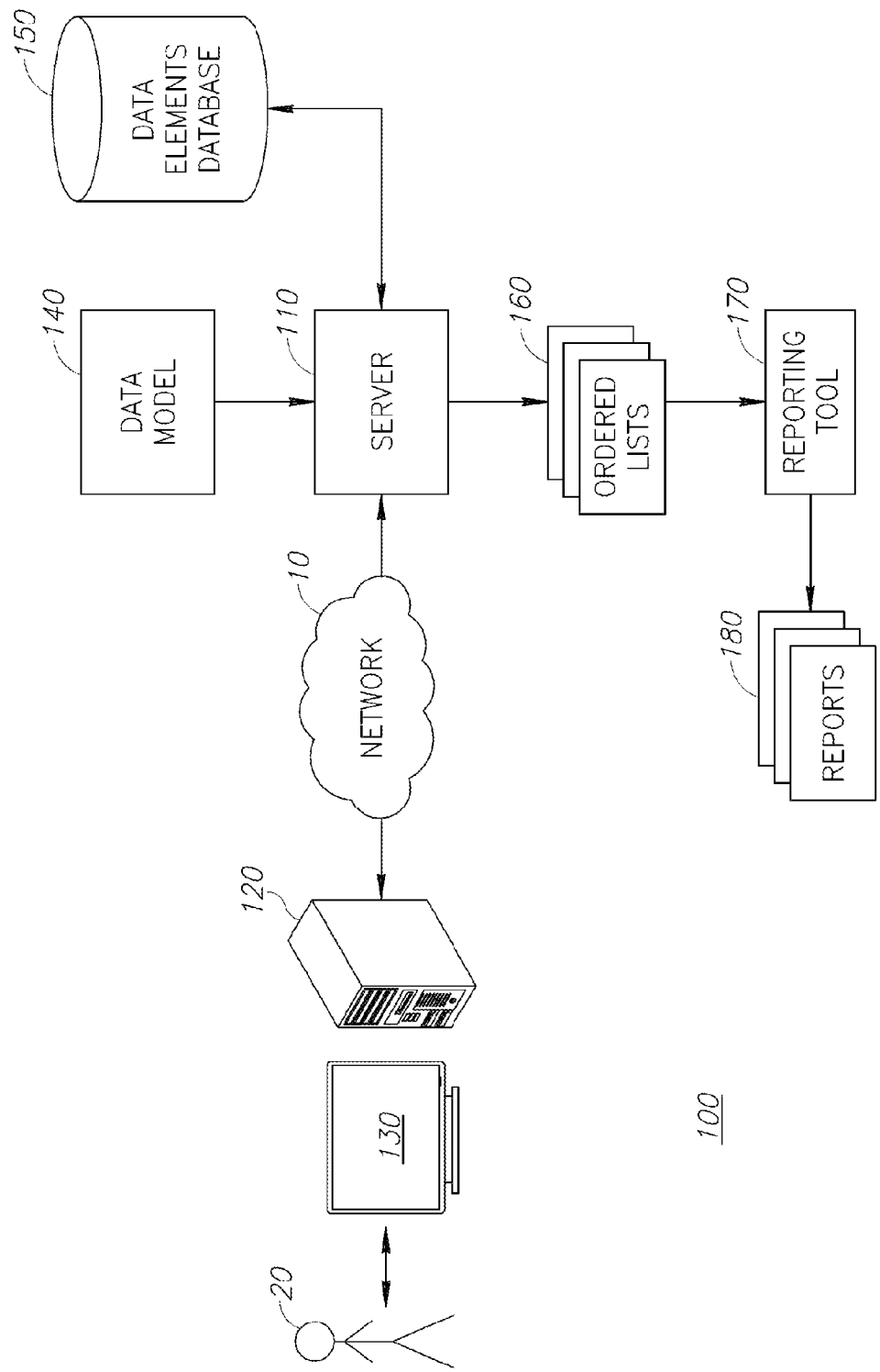
FIG. 1 is a high level schematic block diagram illustrating the environment in which embodiments of the present invention operate.

The drawings together with the following detailed description make apparent to those skilled in the art how the invention may be embodied in practice.

DETAILED DESCRIPTION

With specific reference now to the drawings in detail, it is stressed that the particulars shown are by way of example and for purposes of illustrative discussion of the preferred embodiments of the present invention only, and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

Before explaining at least one embodiment of the invention in detail, it is to be understood that the invention is not limited in its application to the details of construction and the arrangement of the components set forth in the following description or illustrated in the drawings. The invention is applicable to other embodiments or of being practiced or carried out in various ways. Also, it is to be understood that the phraseology and terminology employed herein is for the purpose of description and should not be regarded as limiting.

FIG. 1 is a high level schematic block diagram illustrating the environment in which embodiments of the present invention operate. Environment 100 may include a client computer 120 connected over network 10 to server 110 which in turn connected to a data elements database 150. A user 20 may communicate with server 110 over graphical user interface 130.

In operation, server 110 may be inputted by at least one data model 140 derived from a respective software application whose operation needs to be reported by user 20. Data model 140 may be achieved through the use of a modeler (not shown) or via other means. Server 110 is configured to carry out a sequence of operations as explained below, that yield at least one ordered list 160 of reportable objects associated with the software application whose model is defined in data model 140. The ordered lists may be generated either responsive to any feedback from user 20 or without it and may be used by user 20 in creating reports 180 using reporting tool 170. Specifically, ordered lists 160 may contain information regarding data elements associated with the reported software application that may not be derived from the pure data form of data elements database 150. Advantageously, this kind of information includes, among other things: metadata, relationships between different data elements, and rules regarding visibility of specific data elements to end users of the software application. Thus, a reports based on such information, that is further categorized in an ordered list form of ordered list 160 enable user 20 (who is possibly not computer literate) to prepare a report that is more aware to the actual usage of the software application by other users such as business people (as opposed to IT people).

Figure 2:
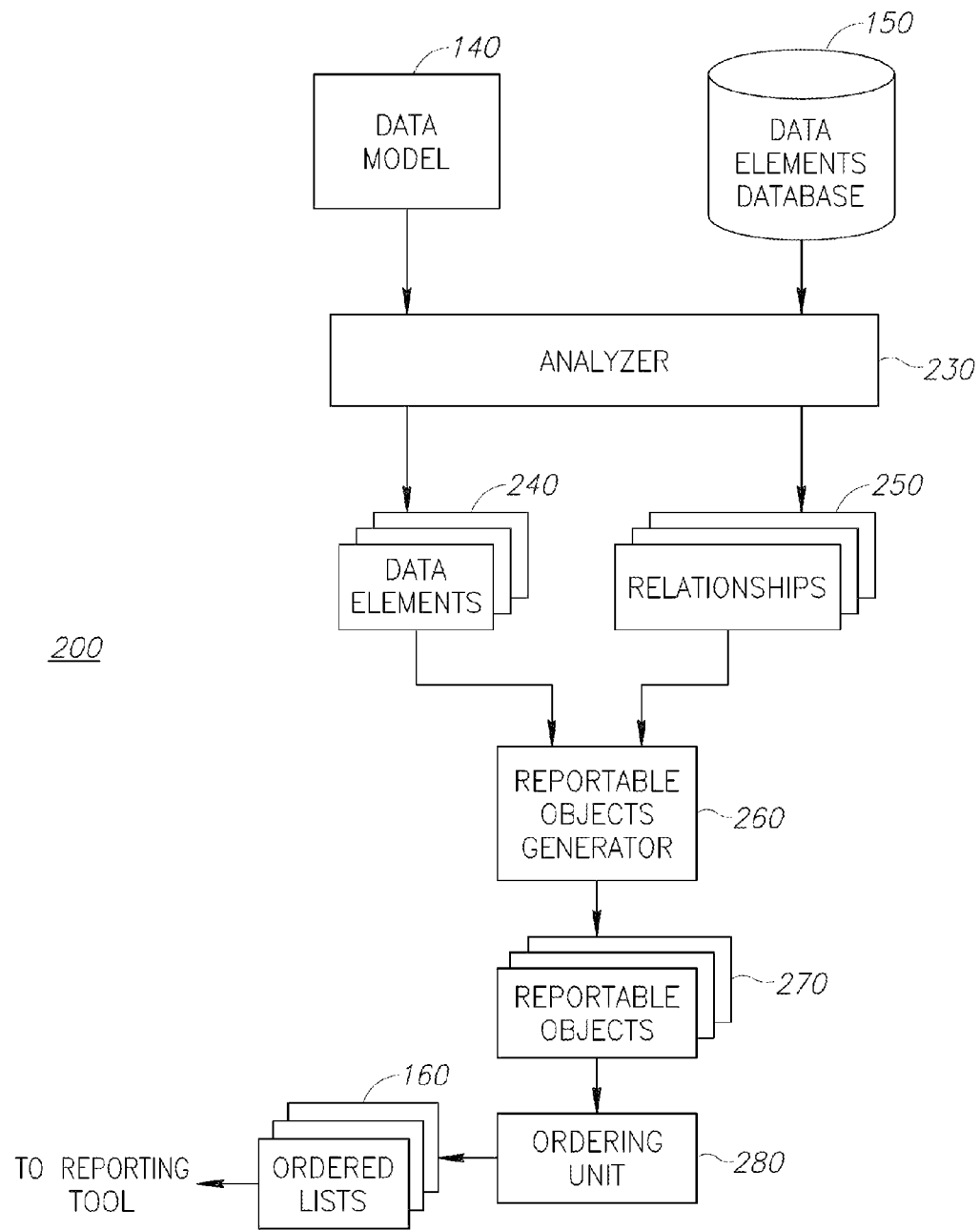
FIG. 2 is a high level schematic block diagram illustrating a system according to some embodiments of the invention.

FIG. 2 is a high level schematic block diagram illustrating in further details a system according to some embodiments of the invention. System 200 that may be possibly but not necessarily implemented by server 110 may include an analyzer 230 configured to analyze a data model 140 and data elements database 150 of a given software application to yield data elements 240 associated with base objects of the software application and relationships 250 between the data elements. In addition, system 200 may further include reportable objects generator 260 configured to generate a list of reportable objects 270 that includes the base objects and objects associated with the data elements 240 and their relationships 250. In addition, system 200 may further include an ordering unit 280 configured to order the reportable objects 270 based on their content and usage or a combination thereof, as derived from data model 140, to yield an ordered list 160 in which the order of the reportable objects 270 reflects content and usage of the data elements 240 in the software application as taken from the point of view of users (possibly business people) actually using the software application as non computer-literate users (as opposed to IT people developing and supporting the software application). Finally, there may be further provided a user interface (not shown) configured to present the ordered list in a form that is usable for building a report on the software application.

Consistent with one embodiment of the invention, analyzer 230 may be further configured to apply a semantic analysis to the model to deduce the relationships between the data elements. The use of semantics improves the ability to derive content based on relationships and logical proximity between the data elements of the same software application which cannot be derived from pure data or the schema of the software application.

Consistent with one embodiment of the invention, the ordering unit is further configured to give higher preference to reportable objects associated with at least one of: a higher level of data and a higher level of usage.

Consistent with one embodiment of the invention, ordering unit 280 may be further configured to order attributes associated with the reportable objects, based on at least one of: availability of the data and usage of the data. Advantageously, the attributes, being on a higher logical level than data elements reflect the manner of use and content of the actual use of the end users of the software application which is an important criteria in reporting.

Consistent with one embodiment of the invention, the user interface may be further configured to visually present the reportable objects in a manner that resembles beyond a specified level, a run-time appearance of the data elements associated with the reportable objects.

Consistent with one embodiment of the invention, system 200 may be further associated with a reporting tool (not shown) which can be any third party tool either available today or that may be available in the future. User 20 may use the ordered lists 160 in conjunction with the reporting tool to create an "end user-aware" report of software application that places more focus on how the data elements are used by and presented to the end users.

Consistent with some embodiments of the invention, values of the reportable objects inputted to the reporting tool may be associated with at least one of: usability and security relevant to end users of the software application, such that the report manifests semantic relationships between data elements of the software application.

An example for the aforementioned deduction of relationships between data elements in the data model may be reflected in a database illustrated by the extraction of a foreign key in a relational database. In a relational database, several tables may be stored such that a specified many-to-many relationship between the elements exists. Such a relationship may be defined in the form of one or more foreign keys stored on a specified pivot table.

In embodiments of the present invention, analyzer 230 may be used to detect a many-to-many relationship between two data elements in the data model which is reflected in the database by a pivot table and track the logic relationship between at least two tables holding pairs of data elements via such a pivot table. Specifically, a relationship between data elements may be a specified form of mapping pure data into a presentation form to an end user. According to such a foreign key, a set of numbers can me mapped into a respective set of characters strings to be presented to the end user. By the aforementioned extraction of the mapping between pure data and presentation data, information relating to the usage and content of these data elements may be achieved, which in turn may be used in ordering the reportable objects in ordering unit 280 as explained above.

Embodiments of the present invention can take advantage of the fact that a data model of a software application includes much semantic information beyond the schema of the data of the application. The data model can include information about the dynamic behavior of the application such as security, visibility rules, workflow, and the like. This kind of information may be leveraged to generate better base reports for a user to work with.

In one embodiment, use of security information to not include columns that the user is not permitted to see may be used to categorize data elements during the report. Similarly dynamic visibility rules may be used either based on related field values or based on a phase in a workflow, to hide columns based on values used to filter the data in the report.

In one embodiment, meta data used in the software application and is irrelevant to the report may be omitted from the report once such a meta data portion is determined as such.

In one embodiment, there is provided an ability in certain cases to add only a subset of related tables, rather than the entire one to the report, again using semantics as opposed to the more limited ability to derive relationships from pure data. Similarly, there is provided an ability to display in the report higher level data types that are stored in multiple columns, as a single entity.

In one embodiment, there is provided the ability to refer in the reports, to user friendly values (in the sense of the way they are known to end users) rather than the pure data stored in the database. This also enables internationalization of the reports.

FIG. 3 is a high level flowchart diagram illustrating a method according to some embodiments of the invention. Method 300 may be implemented over any hardware independently of the aforementioned architecture of system 200. However, for the sake of simplicity, the following explanation of the stages carried out by method 300 is referred to the elements of system 200.

Method 300 starts with the stage of analyzing 310, possibly using analyzer 230, a date model 140 of a software application to yield data elements 240 associated with base objects of the software application and relationships 250 between the data elements 240. The method then goes on to the stage of generating 320, possibly using generator 260, a list of reportable objects 270 comprising the base objects and objects associated with the data elements 240 and their relationships 250. Method 300 then proceeds to the stage of ordering 330, possibly using ordering unit 280, the reportable objects 270 based on at least one of: content and usage of the reportable objects, to yield an ordered list 160. Then, method 300 goes on to presenting 340, possibly over a GUI, the ordered list in a form usable for building a report on the software application.

Consistent with one embodiment of the invention, method 300 may further include the stage of ordering of attributes associated with the reportable objects, wherein the ordering of the attributes is based on at least one of: availability of the data and usage of the data 350.

Consistent with one embodiment of the invention, method 300 may further include the stage of inputting the ordered reportable objects in view of their respective ordered attributes, into a reporting tool to yield a report on the software application.

Advantageously, by carrying out embodiments of the present invention, information from data model can be used to order the fields in the ordered list used for reporting in a way that is similar to the way that they are presented on the screen, for example, ordered by pages, sections, tabs.

Advantageously, since in many IT systems some data is not stored only locally but is sent to external systems, the use of the data model which describes such connections can enable the user to easily report on the data that is being sent to these external systems.

Finally, the run time experience of the reporting process can also be improved by carrying out embodiments of the present invention. Specifically, the data model of the software application may be used to improve how the user is prompted for parameters. A user interface can be used to present data to the user who, in response, validates both the syntax (for example, a valid email address) and semantics (for example, a number in the correct range) of the parameter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wire-line, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like, conventional procedural programming languages, such as the "C" programming language or similar programming languages, as well as scripting languages such as Javascript and the like. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The aforementioned flowchart and diagrams illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In the above description, an embodiment is an example or implementation of the inventions. The various appearances of "one embodiment," "an embodiment" or "some embodiments" do not necessarily all refer to the same embodiments.

Although various features of the invention may be described in the context of a single embodiment, the features may also be provided separately or in any suitable combination. Conversely, although the invention may be described herein in the context of separate embodiments for clarity, the invention may also be implemented in a single embodiment.

Reference in the specification to "some embodiments", "an embodiment", "one embodiment" or "other embodiments" means that a particular feature, structure, or characteristic described in connection with the embodiments is included in at least some embodiments, but not necessarily all embodiments, of the inventions.

It is to be understood that the phraseology and terminology employed herein is not to be construed as limiting and are for descriptive purpose only.

The principles and uses of the teachings of the present invention may be better understood with reference to the accompanying description, figures and examples.

It is to be understood that the details set forth herein do not construe a limitation to an application of the invention.

Furthermore, it is to be understood that the invention can be carried out or practiced in various ways and that the invention can be implemented in embodiments other than the ones outlined in the description above.

It is to be understood that the terms "including", "comprising", "consisting" and grammatical variants thereof do not preclude the addition of one or more components, features, steps, or integers or groups thereof and that the terms are to be construed as specifying components, features, steps or integers.

If the specification or claims refer to "an additional" element, that does not preclude there being more than one of the additional element. \

It is to be understood that where the claims or specification refer to "a" or "an" element, such reference is not be construed that there is only one of that element.

It is to be understood that where the specification states that a component, feature, structure, or characteristic "may", "might", "can" or "could" be included, that particular component, feature, structure, or characteristic is not required to be included.

Where applicable, although state diagrams, flow diagrams or both may be used to describe embodiments, the invention is not limited to those diagrams or to the corresponding descriptions. For example, flow need not move through each illustrated box or state, or in exactly the same order as illustrated and described.

Methods of the present invention may be implemented by performing or completing manually, automatically, or a combination thereof, selected steps or tasks.

The descriptions, examples, methods and materials presented in the claims and the specification are not to be construed as limiting but rather as illustrative only.

Meanings of technical and scientific terms used herein are to be commonly understood as by one of ordinary skill in the art to which the invention belongs, unless otherwise defined.

The present invention may be implemented in the testing or practice with methods and materials equivalent or similar to those described herein.

Any publications, including patents, patent applications and articles, referenced or mentioned in this specification are herein incorporated in their entirety into the specification, to the same extent as if each individual publication was specifically and individually indicated to be incorporated herein. In addition, citation or identification of any reference in the description of some embodiments of the invention shall not be construed as an admission that such reference is available as prior art to the present invention.

While the invention has been described with respect to a limited number of embodiments, these should not be construed as limitations on the scope of the invention, but rather as exemplifications of some of the preferred embodiments. Other possible variations, modifications, and applications are also within the scope of the invention. Accordingly, the scope of the invention should not be limited by what has thus far been described, but by the appended claims and their legal equivalents.

What is claimed is:

1. A method of aiding report construction by users of a software application by inferring implicit application level relationships, the method comprising:

analyzing a data model of the software application to yield data elements associated with base objects of the software application;

inferring, in response to analyzing the data model, implicit application level relationships between the data elements by applying a semantic analysis to the data model;

generating, based on the inferred implicit application level relationships, a list of reportable objects comprising the base objects and objects associated with the data elements and their relationships;

ordering the reportable objects based on at least one of: content and usage of the reportable objects, to yield an ordered list; and presenting, to the users, the ordered list in a form usable for building a report on the software application, wherein the analyzing, the inferring, the generating, the ordering, and the presenting, are carried out by at least one processor;

wherein said semantic analysis allows deriving said implicit application level relationships and logical proximity between the data elements which cannot be derived from pure data or a schema of the data model or the software application.

2. The method according to claim 1, wherein the analyzing is carried out by applying a semantic analysis to the model to deduce the relationships between the data elements.

3. The method according to claim 1, wherein in the ordering, higher preference is given to reportable objects associated with at least one of: a higher level of data and a higher level of usage.

4. The method according to claim 1, further comprising ordering of attributes associated with the reportable objects, wherein the ordering of the attributes is based on at least one of: availability of the data and usage of the data.

5. The method according to claim 1, wherein in the presenting, the reportable objects are visually shown in a manner that resembles beyond a specified level, a run-time appearance of the data elements associated with the reportable objects.

6. The method according to claim 4, further comprising inputting the ordered reportable objects in view of their respective ordered attributes, into a reporting tool to yield a report on the software application.

7. The method according to claim 6, wherein values of the inputted reportable objects are associated with at least one of: usability and security relevant to end users of the software application, such that the report manifests semantic relationships between data elements of the software application.

8. A system for aiding report construction by users of a software application by inferring implicit application level relationships, the system comprising:
an analyzer configured to analyze a data model of the software application to yield data elements associated with base objects of the software application and to infer, in response to analyzing the data model, implicit application level relationships between the data elements by applying a semantic analysis to the data model;
a reportable objects generator configured to generate, based on the inferred implicit application level relationships, a list of reportable objects comprising the base objects and objects associated with the data elements and their relationships;
an ordering unit configured to order the reportable objects based on at least one of: content and usage of the reportable objects, to yield an ordered list; and
a user interface configured to present, to the users, the ordered list in a form usable for building a report on the software application,
wherein the analyzer, the reportable objects generator, the ordering unit, and the user interface, are in operative association with at least one processor,
wherein said semantic analysis allows deriving said implicit application level relationships and logical proximity between the data elements which cannot be derived from pure data or a schema of the data model or the software application.

9. The system according to claim 8, wherein the analyzer further applies a semantic analysis to the model to deduce the relationships between the data elements.

10. The system according to claim 8, wherein the ordering unit is further configured to give higher preference to reportable objects associated with at least one of: a higher level of data and a higher level of usage.

11. The system according to claim 8, wherein the ordering unit is further configured to order attributes associated with the reportable objects, based on at least one of: availability of the data and usage of the data.

12. The system according to claim 8, wherein the user interface is further configured to visually present the reportable objects in a manner that resembles beyond a specified level, a run-time appearance of the data elements associated with the reportable objects.

13. The system according to claim 11, further comprising a reporting tool, to which the ordered reportable objects are inputted in view of their respective ordered attributes, yielding a report on the software application.

14. The system according to claim 13, wherein values of the inputted reportable objects are associated with at least one of: usability and security relevant to end users of the software application, such that the report manifests semantic relationships between data elements of the software application.

15. A computer program product for aiding report construction by users of a software application by inferring implicit application level relationships, the computer program product comprising:
a non-transitory computer readable storage medium having computer readable program embodied therewith, the computer readable program comprising:
computer readable program configured to analyze a data model of the software application to yield data elements associated with base objects of the software application;
computer readable program configured to infer, in response to analyzing the data model, implicit application level relationships between the data elements by applying a semantic analysis to the data model;
computer readable program configured to generate, based on the inferred implicit application level relationships, a list of reportable objects comprising the base objects and objects associated with the data elements and their relationships;
computer readable program configured to order the reportable objects based on at least one of: content and usage of the reportable objects, to yield an ordered list; and
computer readable program configured to present, to the users, the ordered list in a form usable for building a report on the software application;
wherein said semantic analysis allows deriving said implicit application level relationships and logical proximity between the data elements which cannot be derived from pure data or a schema of the data model or the software application.

16. The computer program product according to claim 15, further comprising computer readable program configured to apply a semantic analysis to the model to deduce the relationships between the data elements.

17. The computer program product according to claim 15, further comprising computer readable program configured to give higher preference to reportable objects associated with at least one of: a higher level of data and a higher level of usage.

18. The computer program product according to claim 15, further comprising computer readable program configured to order attributes associated with the reportable objects, based on at least one of: availability of the data and usage of the data.

19. The computer program product according to claim 18, wherein the ordered list are presented by a user interface which is further configured to visually present the reportable objects in a manner that resembles beyond a specified level, a run-time appearance of the data elements associated with the reportable objects.

20. The computer program product according to claim 15, further comprising computer readable program configured to input the ordered reportable objects in view of their respective ordered attributes, yielding a report on the software application.

21. The computer program product according to claim 20, wherein values of the inputted reportable objects are associated with at least one of: usability and security relevant to end users of the software application, such that the report manifests semantic relationships between data elements of the software application.

* * * * *